Jan. 26, 1932.  A. B. BLOMQUIST  1,842,502
DIAL INDICATOR
Filed April 24, 1930    2 Sheets-Sheet 1
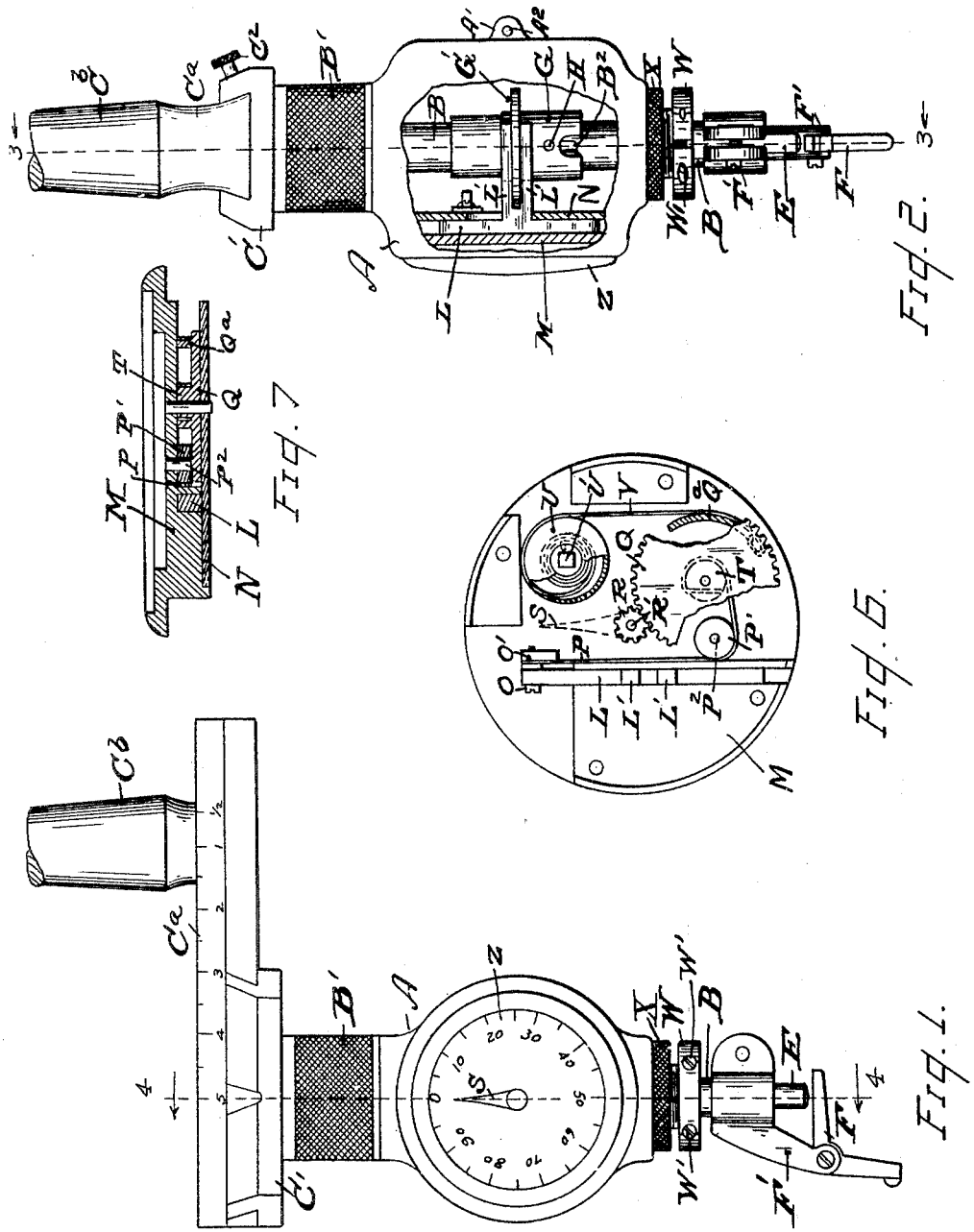
Inventor
Anders B. Blomquist
By S. E. Thomas
Attorney Jan. 26, 1932.   A. B. BLOMQUIST   1,842,502
DIAL INDICATOR
Filed April 24, 1930    2 Sheets-Sheet 2

Inventor
Anders B. Blomquist
By S. E. Thomas
Attorney

Patented Jan. 26, 1932

1,842,502

UNITED STATES PATENT OFFICE

ANDERS B. BLOMQUIST, OF DETROIT, MICHIGAN

DIAL INDICATOR

Application filed April 24, 1930. Serial No. 446,969.

My invention relates to an improvement in dial indicators shown in the accompanying drawings and more particularly described in the following specification and claims.

It is often difficult to obtain a reading from a device of this character due to the necessity of placing it in an inaccessible location, or where it is impossible to obtain proper lighting upon the graduated face of the instrument to accurately follow the movement of the swinging pointer in determining variations of say fifty to one hundred thousandth of an inch, more or less upon the dial, of a surface under construction.

One of the objects therefore of the present invention is to provide an indicator which may be turned to face the operator whereby it may be easily read from any direction and without affecting the operation or accuracy of the instrument.

A further object of this invention includes means whereby the indicator case may also be rigidly held in any adjusted position until it is desired to change the direction in which it is facing.

A further object of the invention is to provide means whereby it may measure either flat or curved surfaces, or internal or external diameters and it may be employed equally well upon either bench tools, grinding or other machine tools, and when used in connection with a swinging arm, is adapted for any desired radius and may be employed while the machine is in operation.

With the foregoing and other objects in view which will appear as the description proceeds, the invention further resides in the combination and arrangement of parts and in the details of construction hereinafter described and claimed, it being understood that changes may be made in the precise embodiment of the invention herein disclosed without departing from the spirit of the same.

In the drawings accompanying this specification:

Figure 1 is a front elevation of the dial indicator attached to a graduated swinging arm adapted to be supported in the spindle of a machine—not shown—to determine measurements of the work while being operated upon by the machine.

Figure 2 is a side elevation of the dial indicator with a portion of its case broken away and parts in section, to more clearly disclose the mechanism.

Figure 6 is an enlarged view of Figure 5, with other parts removed and in section showing further details of construction.

Figure 7 is a cross-sectional view taken on or about line 7—7 of Figure 5.

Figure 5:
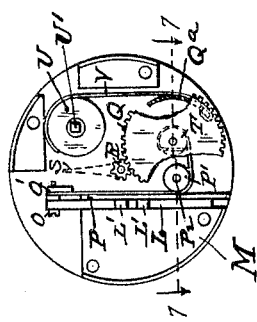
Figure 5 is an elevation of a detail showing parts broken away and in section of the mechanism for operating the swinging pointer.
Figure 4:
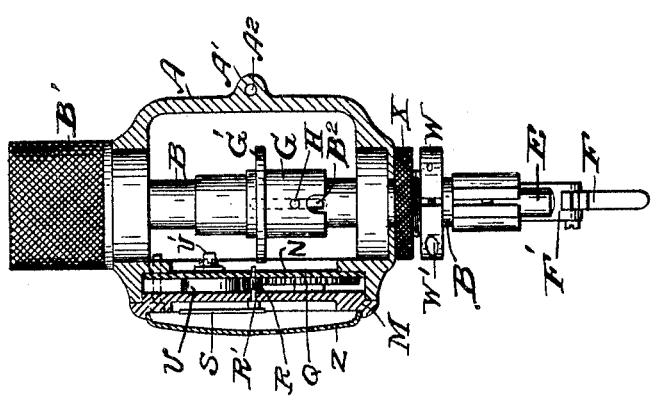
Figure 4 is a vertical cross-sectional view taken at right angles to the preceding figure and on or about line 4—4 of Figure 1.
Figure 3:
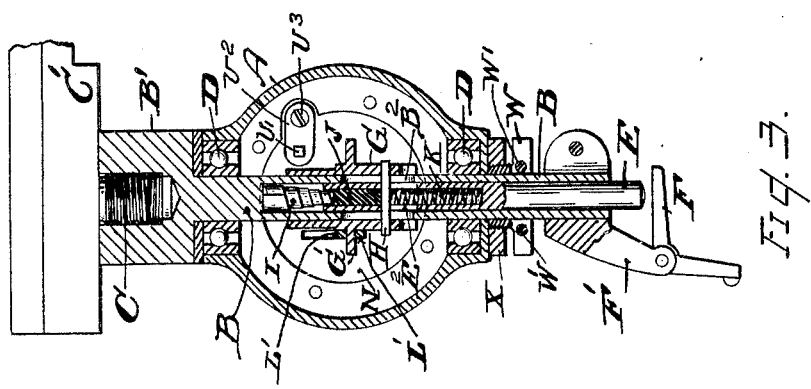
Figure 3 is a vertical cross-sectional view taken on or about line 3—3 of Figure 2.

Referring now to the letters of reference placed upon the drawings:

A denotes a case or housing rotatably sleeved upon a spindle B. The spindle B has an enlarged milled head $B^1$ at its upper end, tapped to receive the screw-threaded shank C of a dovetail member $C^1$ slidable upon a graduated swinging arm $C^a$, fitted with a shank $C^b$ to be supported by the spindle of a machine tool—not shown—on which it is installed.

D, D are ball-bearings, between the case A and the spindle B, respectively housed in upper and lower neck portions integral with the wall of the case.

The spindle B is bored for a portion of its length that it may house a plunger E, which is adapted to bear directly either upon the part to be measured or upon a rocking stylus F bearing on same, pivoted in a bracket $F^1$, detachably clamped upon the lower end of the spindle B. Slidable upon the spindle B is a sleeve G, having a projecting annular flange $G^1$,—the purpose of which will be hereafter explained.

H is a transverse pin supported in the annular wall of the sleeve G and extending through slots $B^2$ in the spindle B and registering slots $E^2$ in the plunger E.

I denotes a relatively weak spring housed in the upper end of the bore of the spindle B, which bears at its upper end against the wall of the spindle and at the lower end upon the pin J, housed in the plunger E, which in turn bears upon the transverse pin H carried by the sleeve G and through the latter serves to return a swinging pointer to zero, as hereafter described.

K denotes a stronger spring housed in a bore in the plunger E which bears against the plunger at one end and against the transverse pin H at the other, serving as a shock absorber should the instrument accidentally fall upon the plunger.

L denotes a sliding bar supported in a groove in the plate M, (see Figures 2 and 7). Integral with the bar L is a pair of spaced arms $L^1$ $L^1$ extending through a slot in the cover plate N to overlap the annular flange $G^1$ of the sleeve G, slidable upon the spindle.

Q is a gear wheel in mesh with a pinion R mounted on a shaft $R^1$, journaled in the plate M.

S is a pointer mounted on the shaft $R^1$ and rotatable with the pinion R.

Secured to the upper end of the bar L by a bolt O and nut $O^1$ is a flat ribbon spring P, which extends downwardly parallel with the bar L and passes thence over an idler $P^1$ mounted on a shaft $P^2$ supported by the plate M.

T denotes a drum integral with the gear Q to which the ribbon spring P is connected. $Q^a$ is a segment integral with the gear and U is a spring drum secured to a shaft $U^1$ journaled in the frame.

V is a coiled flat spring attached at one end to the shaft $U^1$ and housed within the drum U. The spring V extends through a slot in the drum U and is attached at its other end to the segment $Q^a$ integral with the gear Q. $U^2$ denotes an arm secured to the squared end of the shaft $U^1$ by rotating which the spring V is put under tension, $U^3$ is a screw extending through the arm into the plate M to hold the arm that the spring may be held under tension.

W is a split nut embracing the spindle B below the case or housing of the device. $W^1$ $W^1$ are screws connecting the split portions of the nut, upon adjusting which the nut is secured upon the spindle.

The nut W has an upwardly extending screw-threaded sleeve on which is mounted an adjustable nut X formed with a milled edge to facilitate turning, which when adjusted bears upon the downwardly extending neck of the housing to secure the housing against rotation upon the spindle, if so desired.

Z denotes a glass cover for protecting the swinging pointer.

Having now indicated the several parts by reference letters, the construction and operation of the device will be readily understood.

When it is desired to effect the measurement of a cylinder or shaft of relatively large diameter, the device may be mounted upon the screw-threaded shank C of the dovetail member $C^1$, slidable upon a graduated swinging arm $C^a$, as shown in Figures 1 and 2, the slidable member $C^1$ being secured thereto at the proper graduation by a thumbscrew $C^2$.

The graduated arm and slide form no part of the present invention, it will therefore be unnecessary to go into a detail description of this member as the construction of the same is generally undersood by those skilled in the art.

The instrument having been positioned so that the rocking stylus F, or plunger E may bear directly upon the parts or element to be measured, any variation in the diameter or of the surface of the work will cause the plunger E to move carrying with it the relatively strong spring K, which bearing upon the transverse pin H lifts the sleeve G slidable on the spindle B. The flange $G^1$ of the sleeve G extending between the arm $L^1$ of the sliding bar L actuates the bar L, connected through a spring ribbon P with the drum T carried by the gear Q, thus rotating the gear which is in mesh with the pinion R on the shaft of the pointer S, thereby causing the latter to traverse the graduated dial. As the thrust of the work being measured upon the stylus F or plunger E is reduced due to the operation of the grinding or other machine, or to variations in the surface of the element measured, the spring V secured at one end to the segment $Q^a$ and at the other to the shaft $U^1$, forces the gear Q to rotate in a reverse direction thereby causing the pointer S to retract the direction previously taken in accordance with the degree of variation in the instant measurement.

In the event of it being necessary to locate the instrument in an inaccessible, dangerous or poorly lighted position for the machinist in charge of the work to observe the constant changes noted by its swinging pointer, the case or housing A may be turned upon the spindle B at any angle required—and if desired rigidly secured by the adjustment of the nut X—so that the graduated dial may face the operator, or whereby the best lighting may fall upon the graduated dial.

It will now be obvious that the instrument may be adjusted to suit the convenience of the operator at any time during the progress of the machine work without interfering with the accurate operation of the instrument.

Projecting from the back of the case is a lug $A^1$ having a hole $A^2$, to receive a wire rod (not shown) whereby the device may be suspended when taking measurements under certain working conditions.

Having thus described my invention, what I claim is:

1. In a dial indicator, the combination of an annular spindle; a longitudinally movable plunger lodged within the spindle and projecting beyond the end of the latter to bear upon the parts to be measured; a housing rotatably sleeved upon the spindle; a plate including a graduated dial mounted in the wall of the housing; a pointer adapted to traverse the graduated dial, a sleeve having a projecting flange slidable upon the spindle, a transverse pin supported in the annular wall of the sleeve, extending through slots in the spindle and plunger; a bar slidable in a groove formed in the dial plate, having a pair of spaced arms respectively overlapping the upper and lower face of the flange of the sleeve, whereby upon the movement of the sleeve, the slidable bar will be shifted; and means actuated by the slidable bar for shifting said pointer over the graduated dial.

2. In a dial indicator, the combination of a spindle; a case, including a graduated dial, the casing being rotatable upon the spindle; a pointer adapted to traverse the graduated dial; a movable plunger slidable in said spindle and adapted to bear upon the part to be measured; a split nut provided with a screw-threaded sleeve rigidly secured upon the spindle adjacent the case; an adjustable nut mounted upon said screw-threaded sleeve and adapted to be adjusted into contact with the case to secure said case against rotation upon the spindle; and means for operating the swinging pointer, housed within the case and actuated through the movement of the plunger upon traversing the surface of the work being measured.

3. In a dial indicator, the combination of a spindle tapped at one end to receive the screw-threaded shank of a supporting member; a case having upper and lower neck portions, sleeved upon the spindle to receive suitable bearings; anti-friction bearings housed within said necks; a graduated dial supported in the wall of the case; a pointer adapted to traverse the graduated dial; a movable plunger slidable in said spindle and adapted to bear upon the part to be measured; and means for operating the swinging pointer housed within the case and actuated by the movement of the plunger upon traversing the surface of the work being measured.

4. In a dial indicator, the combination of a spindle; a case, a graduated dial housed within the case, a pointer adapted to traverse the graduated dial mounted on a shaft journaled in suitable bearings within the case; a movable plunger slidable in said spindle, and adapted to bear upon the part being measured; a sleeve slidable upon the spindle fitted with an annular projecting flange; a transverse pin supported in the wall of the sleeve and extending through slots formed respectively in the spindle and plunger; a pinion mounted on the shaft of the oscillating pointer, a gear in mesh with said pinion carried by a shaft journaled within the case; a bar slidable in a groove of a supporting frame housed within the case, having spaced arms overlapping opposite sides of the annular flange of the sleeve; a drum mounted upon the shaft of the gear; a ribbon spring, secured at one end to the slidable bar and at the other end to said drum; a second spring drum secured to a supporting wall within the case; a shaft journaled in the walls of said second drum; a segment secured to said gear; a ribbon spring attached at one end to the segment and at the other to the shaft journaled in the second spring drum; and means for winding said spring and cooperating means for holding the spring when under tension.

5. A structure as specified in claim 4 in combination with a relatively light spring housed within the spindle above said transverse pin; and a relatively heavy spring housed in said plunger bearing upon the underside of said transverse pin.

In testimony whereof, I sign this specification.

ANDERS B. BLOMQUIST.